Oct. 3, 1961     A. E. DECAMP     3,002,308
ARTIFICIAL PLANT

Filed July 11, 1958     3 Sheets-Sheet 2

INVENTOR.
ANDRE EMILE DECAMP
BY
Kane, Dalsimer and Kane
ATTORNEYS

Oct. 3, 1961 — A. E. DECAMP — 3,002,308
ARTIFICIAL PLANT
Filed July 11, 1958 — 3 Sheets-Sheet 3

INVENTOR.
ANDRÉ EMILE DECAMP
BY
Kane, Dalsimer and Kane
ATTORNEYS

United States Patent Office 3,002,308
Patented Oct. 3, 1961

3,002,308
ARTIFICIAL PLANT
André Emile Decamp, 45 Chemin des Peupliers (Caluire), Lyons, France
Filed July 11, 1958, Ser. No. 747,901
7 Claims. (Cl. 41—13)

The present invention relates to an artificial plant, made of molded plastic material, and to its assembly process.

An object of this invention is to provide an improved and readily assembled artificial plant having certain of its parts and elements individually prefabricated.

Another object is to provide a versatile artificial plant structure capable of producing a variety of plant and floral effects and appearances.

A further object is to provide a selectively variable artificial plant structure capable of being manufactured by mass production techniques and at a relatively decreased cost.

An important object is to provide an artificial plant structure capable of being disassembled after parts thereof have been assembled in order to alter or change the visual and floral effects and appearances of the plant.

Another important object is to provide an artificial plant structure capable of being mounted in a plant pot having means simulating earth.

In brief, an artificial plant fabricated in accordance with the present invention, includes a main stalk which may include branches extending integrally therefrom. Secondary branches are provided to increase the number of main stalk branches. Certain of the branches may be provided with means for mounting a plant leaf. Other branches may present means for mounting a cluster of either buds or flowers. These clusters are provided with the usual sepals and stems for supporting the selected individual buds or flowers. The cluster of buds is provided with means for forming a plurality of rows of buds in order to increase the size of the cluster. Included within the bud cluster structure are additional means for selectively orienting the individual bud stems and consequently extending their buds. The lengths of the bud stems are varied to decrease the effect of uniformity of the prefabricated cluster parts. The flower cluster, on the other hand, includes stems for presenting a flower calyx which are, in turn, adapted to mount several rows of flower petals. Again, the length of the flow stems is varied to avoid uniformity, and are adapted to be selectively oriented by cooperating with surfaces of the flower cluster sepal.

When it is desired to mount the artificial plant structure in an artificial plant pot, means are provided at the bottom extremity of the main stalk for coupling the plant to a prefabricated disc simulating earth, resting on surfaces of the pot, and for the further purpose of securing the plant to the pot.

Other objects and advantages will become apparent from the following detailed description which is to be taken in conjunction with the drawings, in which:

FIG. 5 is a fragmentary elevational view of the terminal portion of a leaf mounting branch; and FIG. 6 is a fragmentary elevational view of a portion of a leaf, with certain parts being shown in section.

Figure 1:
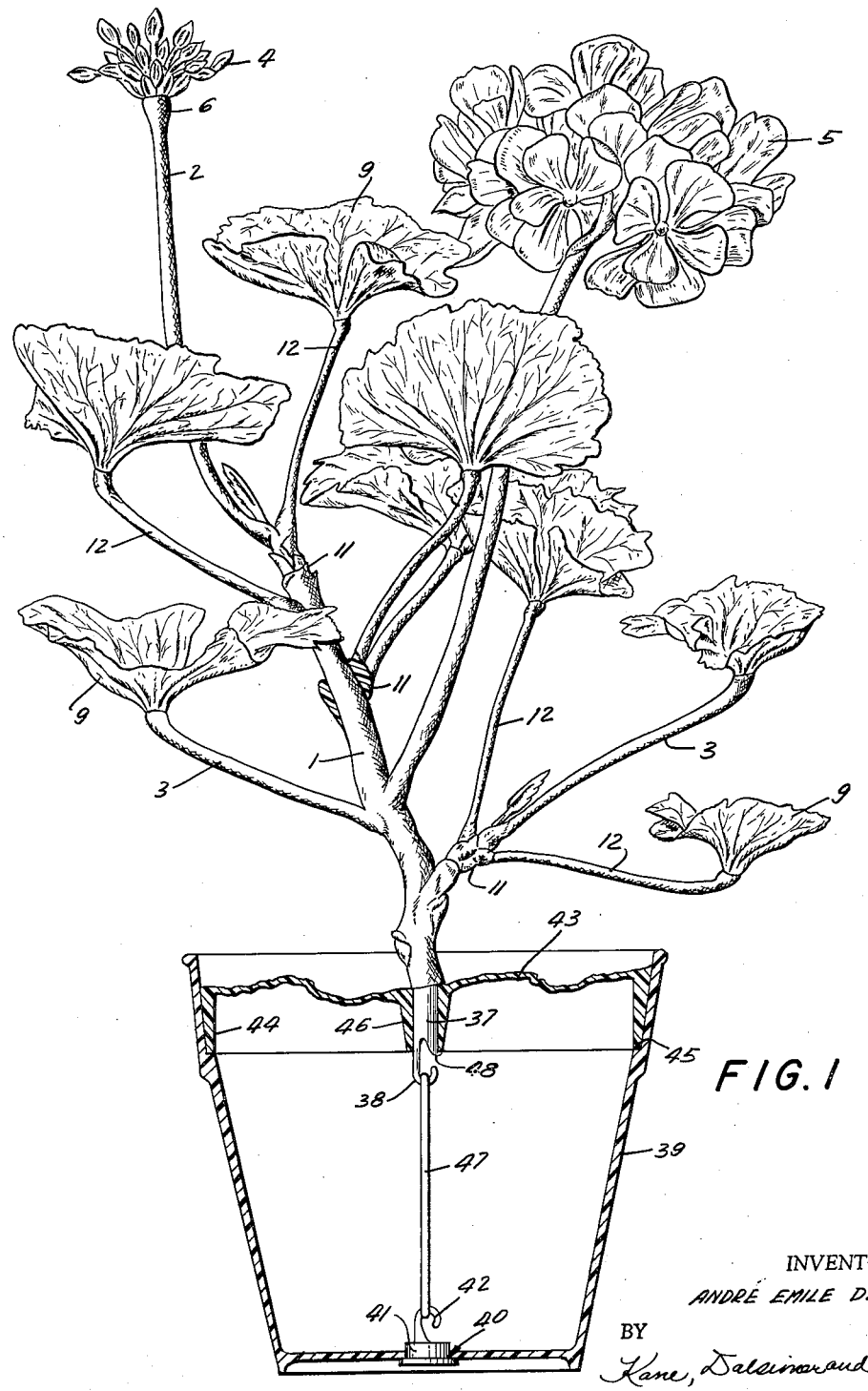
FIG. 1 is an elevational view of an artificial plant, fabricated in accordance with the present invention, suitably mounted in a plant pot, with certain parts of the resultant structure broken away and removed.
Figure 2:
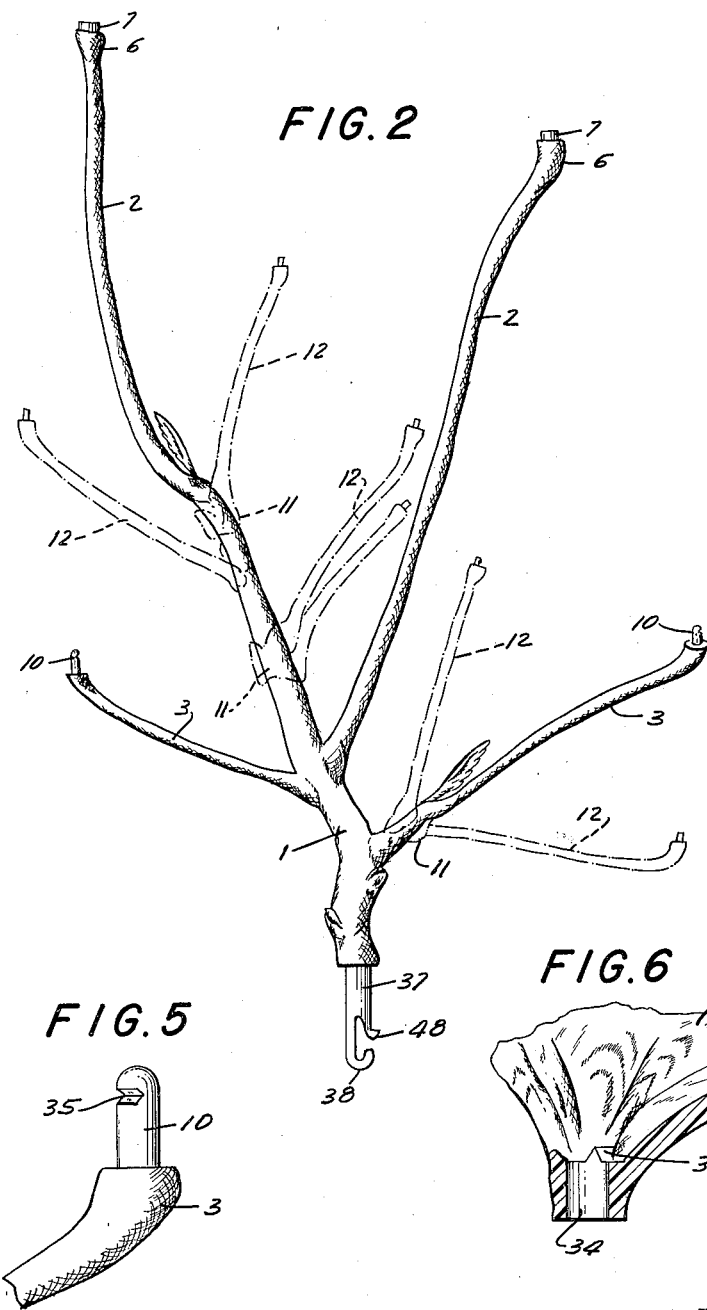
FIG. 2 is an elevational view of the main stalk structure having integrally extending branches, with secondary branches illustrated in phantom.
Figure 3:
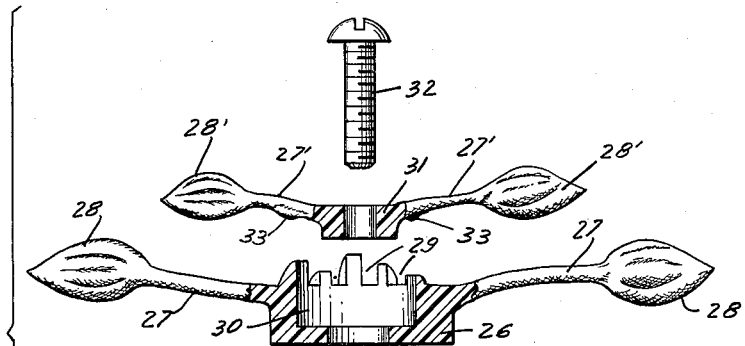
FIG. 3 is an exploded elevational view, with certain parts broken away and sectioned, of the structure constituting a bud cluster.
Figure 4:
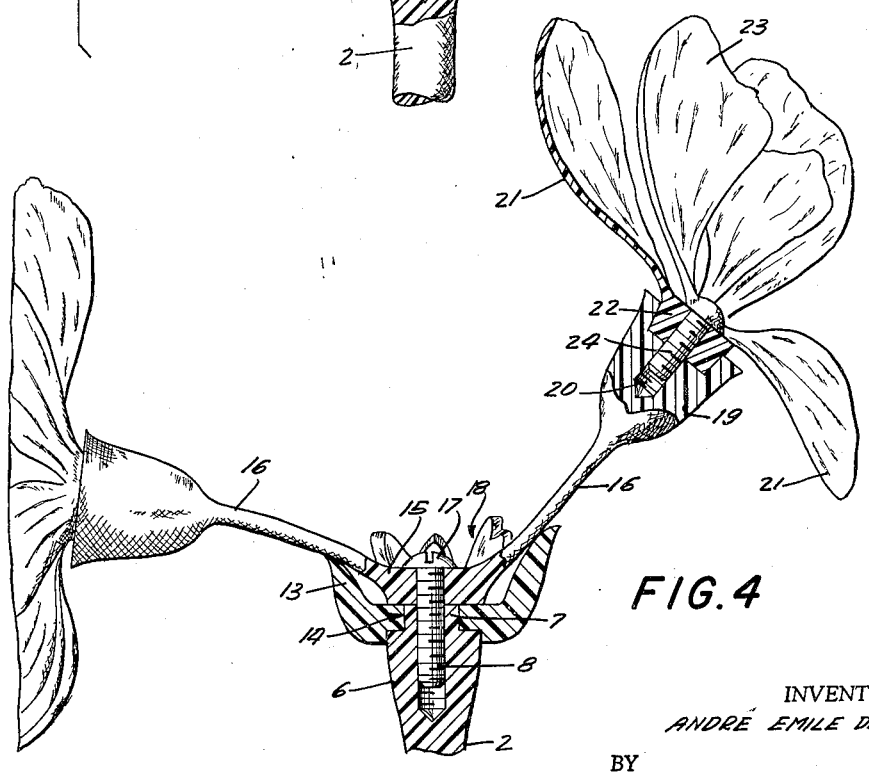
FIG. 4 is an elevational view of the structural elements involved in forming a flower cluster, with certain parts broken away and removed.

In the drawings I have illustrated an artificial plant, which, for purposes of this invention, is taken to be a potted geranium; but it should be understood that this disclosure is applicable to other type plants.

Additionally, the individual components of this artificial plant are, in most instances, preferably prefabricated from a suitable moldable plastic material. The illustrated geranium plant is composed of a main stalk 1 molded with several branches extending integrally therefrom, namely, branches 2 and 3. The branches 2 are designed to support the cluster of buds 4 or flowers 5 and include a swelling or enlargement 6, terminating in a reduced stud 7. This stud 7, as well as portions of the enlargement 6, are longitudinally pierced or tapped by a threaded bore 8. The branches 3, on the other hand, are designed to support the leaves 9 and terminate in a pin 10, the purpose of which will be described shortly.

A plurality of secondary stalks 12 may be provided on the plant structure and as illustrated, each may extend into a leaf 9, located on the terminal portion of the free end thereof. Each of the secondary stalks 12 projects from a sliding ring 11 which is adapted to be slidably mounted on the main stalk 1.

The cluster of flowers 5 is composed and assembled in the following manner. A relatively small cup 13, representing the flower sepal, is pierced centrally with a hole 14 and accordingly, is adapted to be mounted by the stud 7 of the branch 2. A ring 15 bearing the stems or stalks 16 of the flowers, is placed inside the cup 13. The sepal cup 13 and ring 15 are then secured to the branch 2 by means of a screw 17 which is adapted to be meshed with the threaded bore 8 present in the stud 7 and branch enlargement 6.

The stems 16 are appropriately and in most respects selectively oriented by means of notches 18 formed in the cup 13, and further, are of different lengths in order to avoid uniformity. These stems 16 include at the free ends thereof a calyx 19 having a centrally located annular recess terminating in a threaded bore 20.

The individual flowers 5 comprise an outer row of petals 21 extending from a ring 22 and an inner row of petals 23 attached to a screw 24, which, in turn, is adapted to be passed through the bore of ring 25 and ultimately engage the threads of bore 20 of the calyx 19.

The cluster of buds 4 is similarly formed and assembled and includes an apertured cup 25 which again represents a flower sepal. The aperture of this cup 25 is adapted to receive the stud 7 extending from the branch enlargement 6. In addition, cup 25 is further adapted to embrace the ring 26. This ring 26 bears the stems 27 of the buds 28, which constitute the outer row of buds for the subject bud cluster. A series of cogs 29 extends from the upper peripheral portions of the rings 26. A central hollow 30 is formed in ring 26 and is adapted to receive another ring 31 which bears the stems 27' of the buds 28', forming the inner row of buds in the cluster. A screw 32 extends through ring 31, ring 26 and cup 25 and then into the threaded bore 8, to thereby secure these parts to branch 2.

Furthermore, stems 27 of the outer row of buds 28 are adapted to be oriented in the same manner as those of the flowers, namely, by means of the notches appearing at the upper edge of the cup 25. The orientation of the stems 27' of the inner row of buds 28' is accomplished by stem projections 33 which are so constructed and arranged that, upon assembly of the instant cluster, the projections 33 are adapted to fit into the notches between cogs 29 of ring 26 at selectable and variable depths.

For the purpose of attaching the leaves 9 to their mounting stalks or branches 3 or 12, a longitudinally extending bore 34 is provided in the structure of the leaf 9. This bore 34 is suitably dimensioned to neatly embrace the stud 10 that extends from the particular mounting branch 3 or 12. The leaf structure may then be fixed to its mounting stalk or branch simply by fusing or by the employment of a suitable adhesive. However, when the plastic materials employed for the leaf 9 and stud 10 do not have a common solvent or an adhesive, or when the materials employed for the stem and the leaf are different and have different melting points, or when these materials are not fusible, additional means for providing the desired securement of the subject parts are provided. Accordingly, the stud or pin 10, once it has been properly extended through bore 34, protrudes beyond the upper surface of the zones of the leaf 9 adjacent bore 34. The pin 10 is provided with a notch 35 which is adapted to be exposed subsequent to the insertion of pin 10 into bore 34. Moreover, on the surface of the leaf 9 adjacent the bore 34, projections 36 and, if desired, similarly located indentations are provided for purposes which will become apparent shortly. Once a leaf 9 has been mounted on its selected pin 10, it is secured thereto by means of a relatively small quantity of an appropriate material such as an adhesive or resin in such a manner that upon drying or curing, this material becomes substantially solid or rigid while embracing surfaces of notch 35 and projections 36, to thereby consolidate or unite these parts structurally and functionally.

If the aforementioned geranium plant is to be planted in ordinary earth or some other appropriate material, its main stalk 1 is simply extended downwardly for a sufficient distance, terminating, if desired, into a point.

If the geranium plant, on the other hand, is destined to be presented in a specially-designed pot or the like, the lower extremity of the main stalk 1 will include a pin 37 which may be, for example, substantially cylindrical and preferably terminates in a hook 38. A plant mounting pot 39, which may also be made of a suitable plastic material, has formed in the center of its bottom a hole 40 in which may be fitted a mushroom-shaped stopper type member 41. A hook 42 extends from member 41 into the interior of pot 39. The earth which would ordinarily fill the interior of pot 39 is represented by a disc 43 of plastic material which is mounted interiorly of the relatively wider upper part of the pot 39. This mounting is provided by an integral skirt 44 extending laterally from the peripheral edges of the disc 43 and resting upon a ledge 45 formed in the interior walls of pot 39. A sleeve 46 projects downwardly from disc 43 and has a suitably dimensioned bore for receiving and cooperating to support the cylindrical pin 37 of main stalk 1. An elastic band 47 or other appropriate resilient means, is then coupled with hook 38 and 42 to thereby anchor the plant to the pot. If it is found to be necessary, the disc 43 may be connected with the main stalk 1 prior to the mounting of these elements in pot 39. In this connection, a small barb 48 may extend from the pin 37 to ultimately engage the lower edge of the sleeve 46. If the selected plastic materials do not possess the necessary elasticity and resiliency, the barb 48 may be mounted at one end of a flexible tongue (not shown) suitably anchored to the outer surface of pin 37 and extending substantially parallel to the axis of the latter.

The present invention is obviously not limited to the plant and process described and illustrated. The fabrication of the various parts, as well as their assembly, is applicable to larger and more complex plants as well as other types of artificial plants, which may be smaller in stature. Thus, among others, the aforementioned objects and advantages are most effectively attained. Accordingly, it is intended that the scope of this invention be defined by the appended claims.

I claim:

1. In an artificial plant, a foliage bearing stalk mounted on a ring which is integral with said stalk, a centrally pierced cup member having an inner periphery which is slightly larger than the outer periphery of said stalk ring adapting said ring to be inserted into said cup, a stem supporting said cup member and said stalk on its ring within said cup member, said stem being provided with a bore at its end, said stalk ring having its base pierced with a central opening for attachment to said cup member and stem, said cup member being recessed at its bottom surface about its centrally pierced portion for insertion of the end of said stem and fastening means through said central opening and said bore to fasten said stem and cup to said stalk.

2. A plant as claimed in claim 1 wherein said stem is tapered outwardly adjacent its end and terminates in a narrowed stud portion and the bottom of said cup member which is recessed about its central opening receives said stud whereby the upper surface of said stem presents an appearance of outer gradual thickening adjacent said ring in foliage supporting position.

3. An artificial flower as claimed in claim 1 wherein said cup member is notched about its periphery to provide orienting guide surfaces for the stalk.

4. An artificial flower as claimed in claim 1 having a plurality of foliage bearing stalks each mounted on a ring integral with the respective stalk, the respective rings nesting within each other and each having a centrally pierced base for fastening and mounting in nesting relation within a common cup member, the ring of an upper stalk of said plurality nesting within the ring of the lower stalk of said plurality of stalks and both upper and lower stalks nesting within the cup-shaped member.

5. An artificial flower as claimed in claim 1 in which said stalks, rings, stems and fastening means are jointed to a trunk at the end of said stem, said stem being provided with a stud end and said trunk being pierced with an opening for receiving said stud end.

6. An artificial flower as claimed in claim 5 in combination with a pot, said trunk provided at its base with a hook and said pot provided at its base with a hook and elastic means joining said hooks to fix said plant relative to said pot.

7. An artificial flower in a pot as claimed in claim 6 wherein the base of said trunk above said hook is provided with a disc mounted interiorly of said pot to simulate earth.

References Cited in the file of this patent

UNITED STATES PATENTS

| 226,922   | Moses   | Apr. 27, 1880 |
| 1,730,628 | Rogers  | Oct. 8, 1929 |
| 1,879,677 | Gockel  | Sept. 27, 1932 |
| 2,140,022 | Martin  | Dec. 13, 1938 |
| 2,432,632 | Seibei  | Dec. 16, 1947 |
| 2,826,846 | Warren  | Mar. 18, 1958 |

FOREIGN PATENTS

| 784,333   | Great Britain | Oct. 9, 1957 |
| 1,123,738 | France        | June 18, 1956 |
| 1,142,300 | France        | Mar. 25, 1957 |